T. P. ANTHONY.
MOLDING APPARATUS.
APPLICATION FILED JUNE 26, 1920.

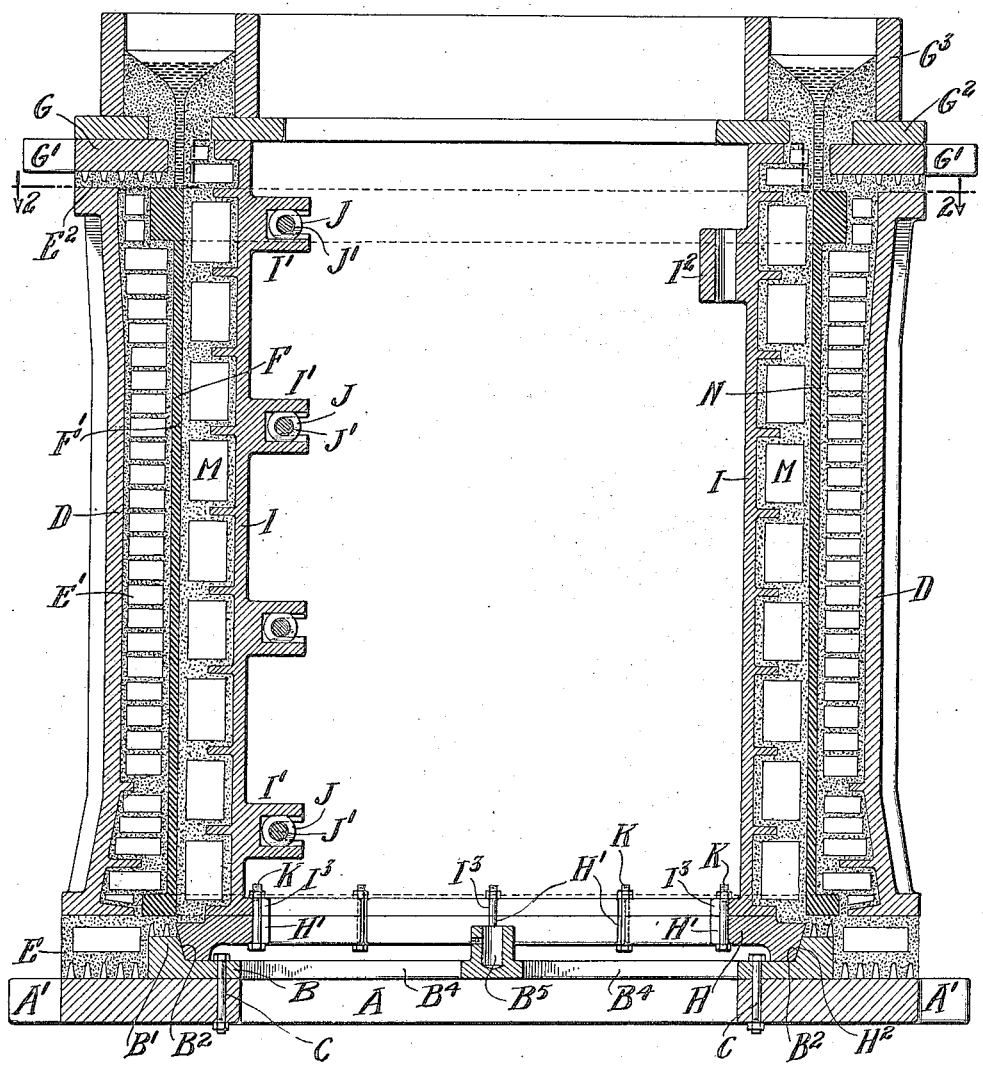

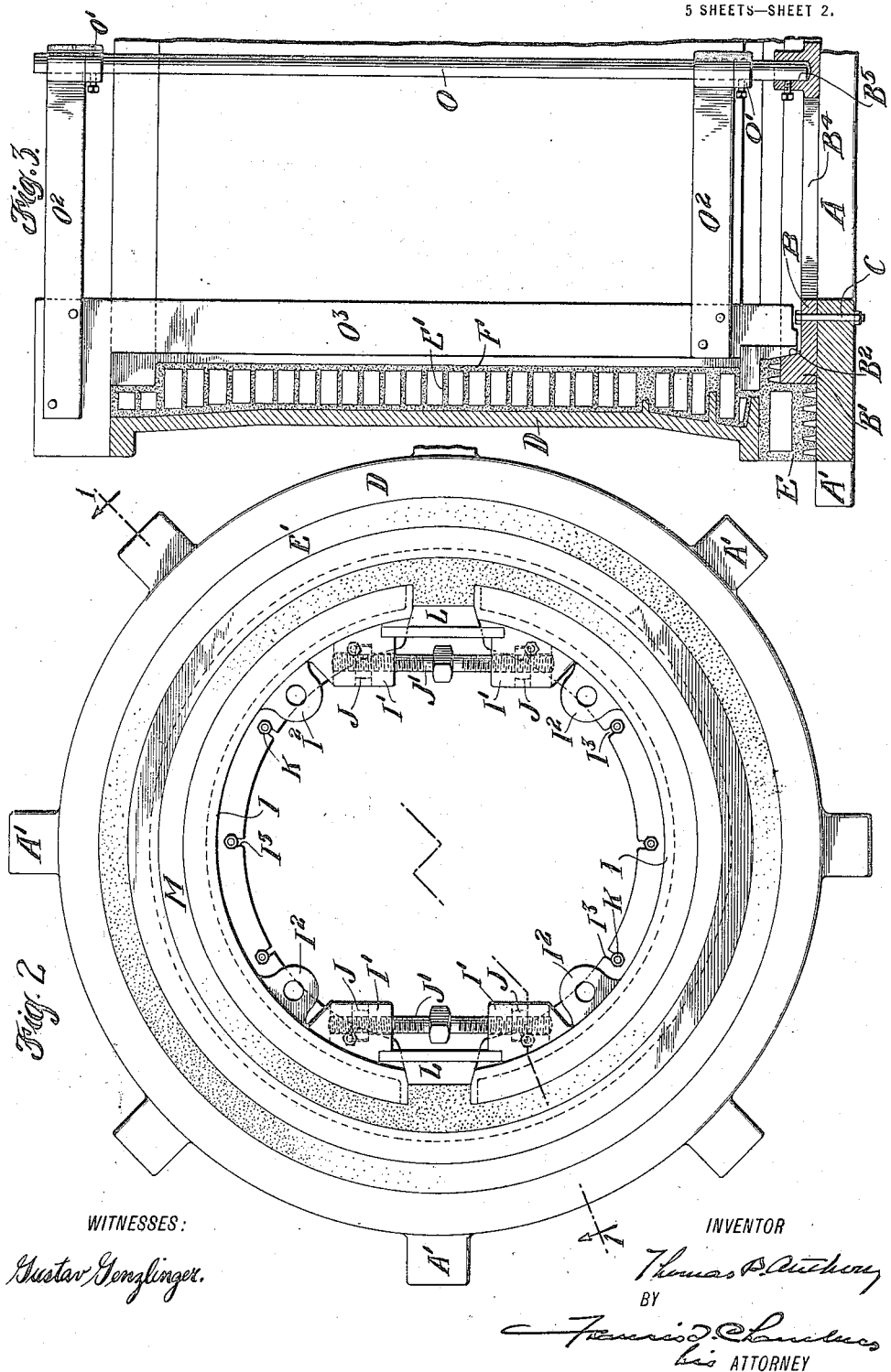

1,425,230.

Patented Aug. 8, 1922.
5 SHEETS—SHEET 3.

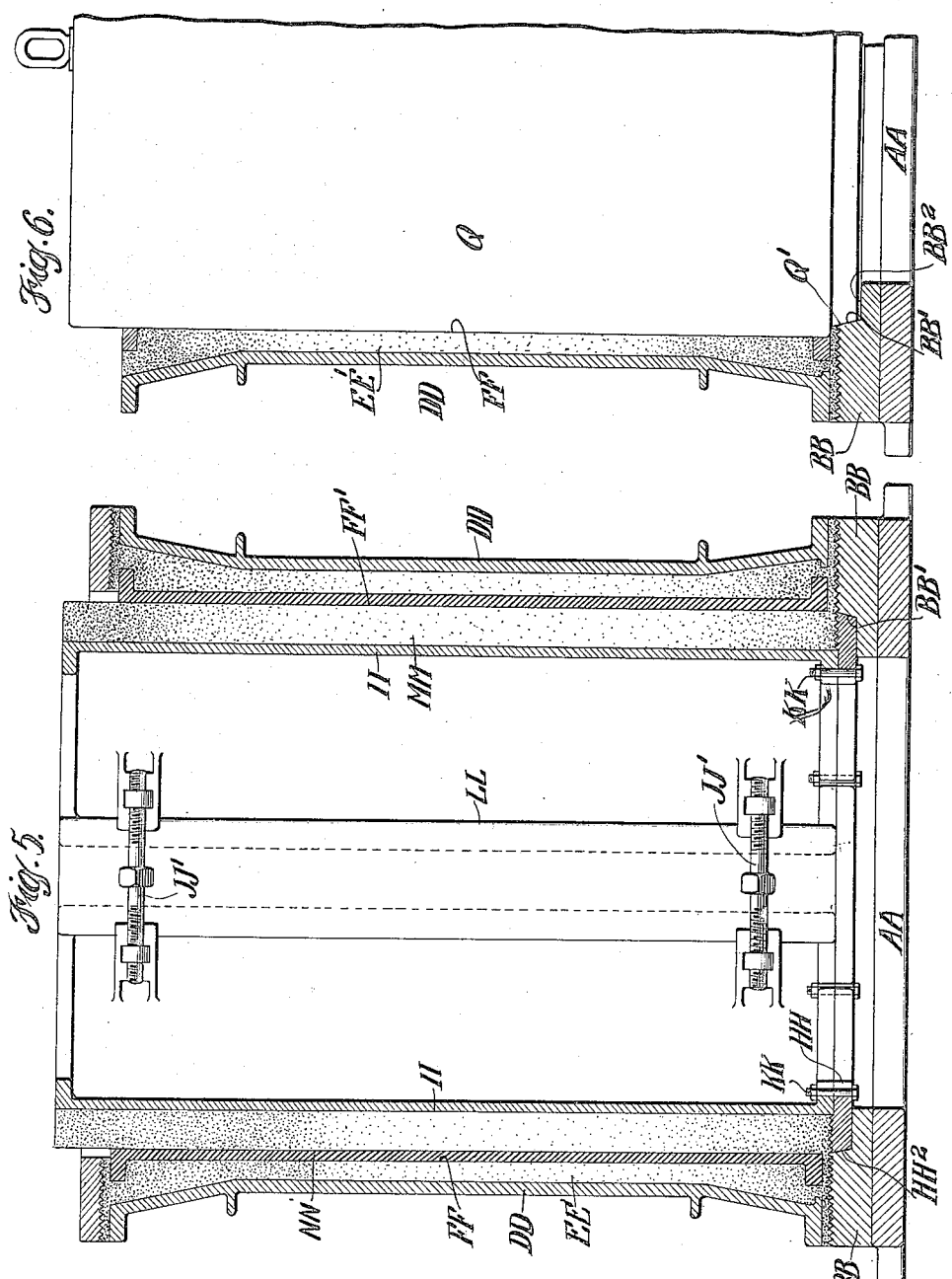

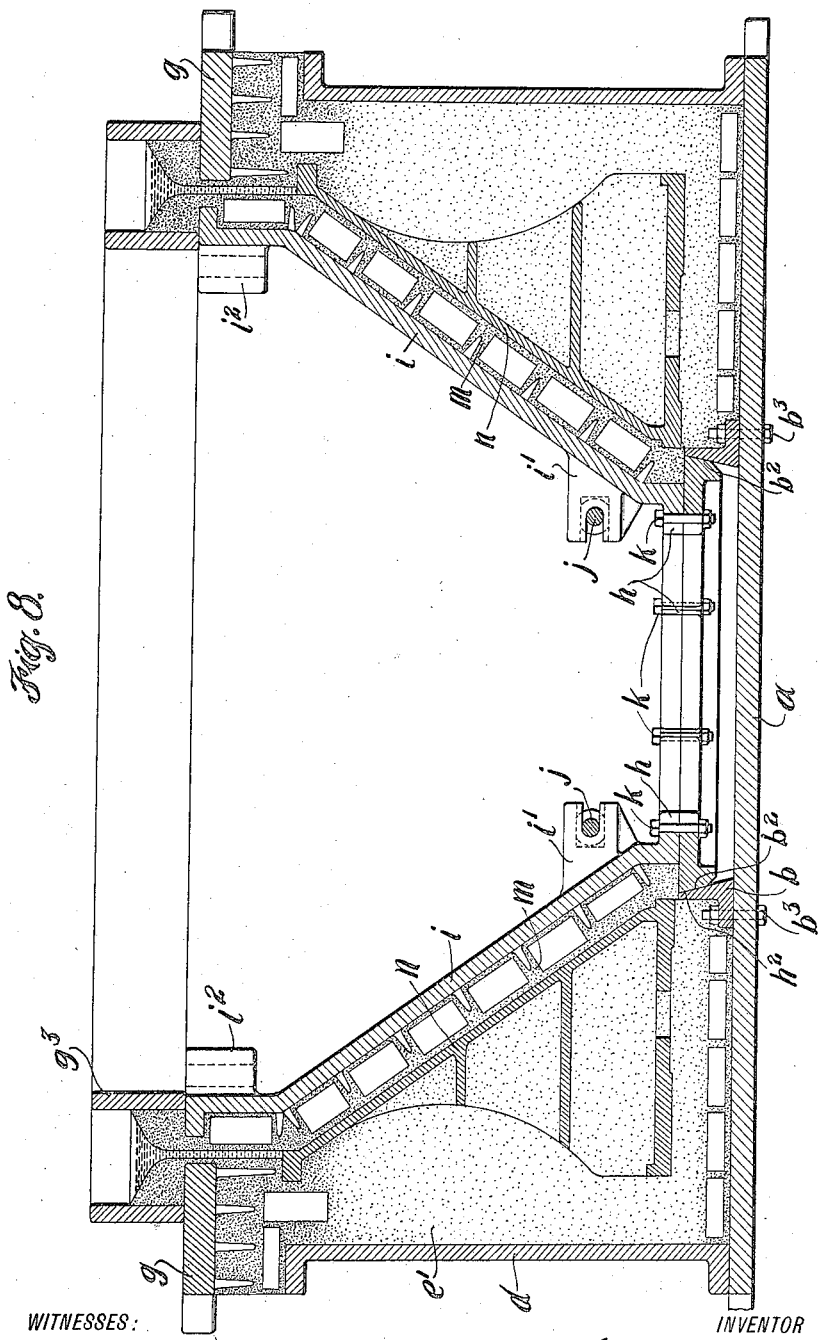

UNITED STATES PATENT OFFICE.

THOMAS P. ANTHONY, OF EDGEWATER PARK, NEW JERSEY, ASSIGNOR TO UNITED STATES CAST IRON PIPE & FOUNDRY COMPANY, OF BURLINGTON, NEW JERSEY, A CORPORATION OF NEW JERSEY.

MOLDING APPARATUS.

1,425,230.

Specification of Letters Patent. Patented Aug. 8, 1922.

Application filed June 26, 1920. Serial No. 391,855.

*To all whom it may concern:*

Be it known that I, THOMAS P. ANTHONY, a citizen of the United States of America, and resident of Edgewater Park, in the county of Burlington and State of New Jersey, have invented a certain new and useful Improvement in Molding Apparatus, of which the following is a true and exact description, reference being had to the accompanying drawings, which form a part thereof.

My invention relates to molding apparatus and has particularly in view the accurate formation and assembling of molds and cores used in casting large cylindrical or similar castings.

The nature of my improvements devised with the above mentioned objects in view will be best understood as described in connection with the drawings in which—

Figure 1 is a vertical sectional view taken as on the line 1—1 of Fig. 2, showing a mold and core embodying my improvements assembled together and with the cast metal shown in place.

Figure 2 is a plan view on the line 2—2 of Fig. 1.

Figure 3 is a sectional elevation showing the way in which a flask and mold built up therein in the manner shown in Fig. 1 has the inner face of the mold properly spaced with regard to the centering mechanism.

Figure 5 is a sectional elevation of a sand mold embodying my improvements.

Figure 6 is a sectional elevation illustrating the method by whcih the flask shown in Fig. 5 is lined and the wall of the sand properly spaced with regard to the centering mechanism.

Figure 7 is a sectional elevation showing the way in which the core shown in Fig. 5 is built up and its walls properly centered and Figure 8 is a sectional elevation showing my improvement as applied to the formation of a mold for a casting of different and more irregular form than shown in the other drawings.

A, Fig. 1, is a base plate for supporting the mold provided with outwardly extending lugs as indicated at A' for convenient handling. B is a centering device shown as secured to the base plate A by bolts C, C, and having, as shown, an upwardly extending rim B' formed with a conical seat portion $B^2$. The centering device B is shown as provided with inwardly extending radial arms $B^4$ supporting a centering socket $B^5$. D is the flask shown as supported on the base A through brick-work indicated at E, E' indicating the brick-work built up inside of the flask and F the mold lining forming the surface of the mold. $E^2$ indicates a layer of brick-work on the top of the flask upon which as shown rests an annular plate G having ears G' and supporting an annular plate $G^2$ having perforations formed through it and supporting in turn the annular chamber $G^3$ in which are formed the pouring gates for the melted metal as indicated.

H is a core supporting plate formed with a tapered edge portion $H^2$ adapted to fit in the tapered portion $B^2$ of the plate B. This plate H is formed with internal recesses H'. I, I, are the two parts of the core center which is made in sections so as to be collapsible and, as shown, the parts are formed with ears I' I' supporting nuts J, J, in which are screwed the right and left threaded bolts J' J'. $I^2 I^2$, etc. are perforated inwardly extending lugs provided for the convenient handling of the core and $I^3$ is an inwardly extending slotted rim at the bottom of the core center sections. K, K, are bolts passing through the slots H' and $I^3$ and securing the core center to the plate H. L, L, are tapered blocks adapted to fill or partially fill the spaces between the core center parts. M, M, indicate the brick-work built up around the core center and F' the mold lining on the face of this brick-work. N indicates the cast metal in place between the mold and core.

O, Fig. 3, indicates a vertical shaft which in the formation of the mold is stepped in the center $B^5$ and has attached to it collars O' O' against which rest the hubs of the arms $O^2 O^2$ which support the scraper or strike $O^3$ which is revolved in the flask and serve to give proper contour and form to the mold lining of the flask.

Figure 4:
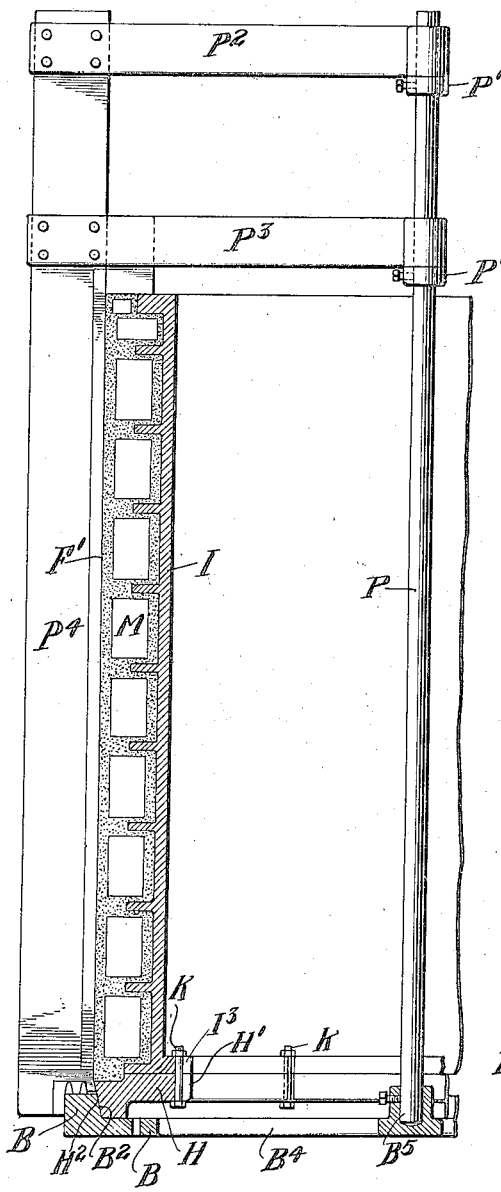
Figure 4 is a similar sectional elevation showing the core center, core support and core proper built up as shown in Fig. 1 and the manner in which the surface of the core is properly spaced with regard to the centering mechanism.

P, Fig. 4, is a shaft stepped in the center $B^5$ of a plate B similar to the plate B shown in Figs. 1 and 3 and used in the formation of the core to center the plate H as shown; P' P' being collars secured to the shaft P and supporting the arms $P^2$ $P^3$ which in turn support the scraper $P^4$ by which the form and proper centering of the mold lining F' of the core is determined.

Figure 7:
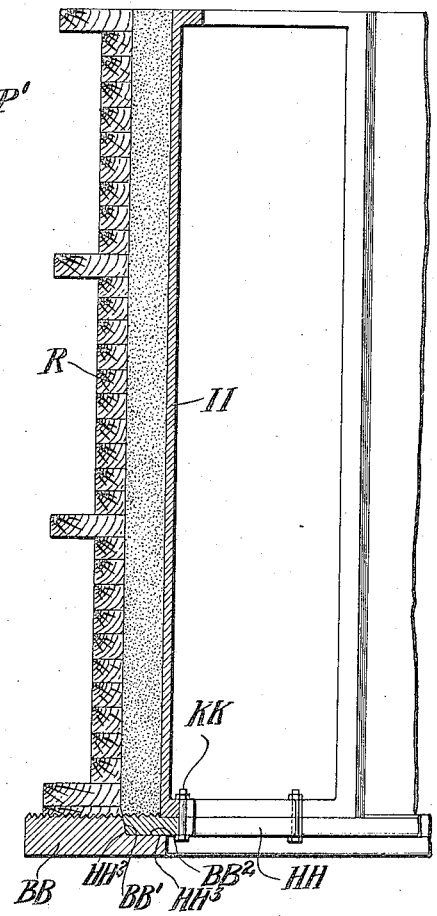

Referring next to Figures 5, 6 and 7, AA is a supporting plate similar to the plate A of Fig. 1. BB is a centering plate somewhat differently formed from the plate B of Fig. 1 but like it having a conical centering seat shown at BB'. DD is the flask, EE' the sand lining of the flask; HH is the centering and supporting plate of the core having a conical edge $HH^2$ adapted to fit in the conical seat BB'. II, II, are the sections of the core center secured to the plate HH by bolts KK and secured together by the right and left threaded bolts JJ', LL, being the filling pieces and MM the core formed on the core center. Q, Fig. 6, is the pattern used in forming the mold, the pattern being centered and held in position by a conical extension Q' which fits in the conical seat BB' of the plate BB. R, Fig. 7, is a cylindrical pattern used in forming the core, plate HH of the core being seated in the conical seat of plate BB similar to the plate BB of Fig. 5 and the pattern R being of course carefully centered on this plate. Referring to Fig. 8 $a$ is the base plate to which is secured a conical seat $b$ by means of bolts $b^3$; $d$ is the mold, $g$ $g^3$ parts similar to G and $G^3$ of Fig. 1; $h$ the sand supporting and centering plate of the core formed with a conical edge $h^2$ which fits in the conical seat $b^2$; $i$ $i$ are parts of the collapsible core center having as in the before described construction ears $i'$ and adjusting screws $j$ and handling lugs $i^2$, $k$ indicating the bolts which secure the core center to the plate $h$.

In the make-up and assembling of the mold shown in Figs. 1 and 2 the flask is located on its supporting plate and built up with brick-work as indicated and then loam is applied to the inner face of the brick-work and given proper spacing and conformation by the action of the scraper $O^3$ shown in Fig. 3 which gives to the inner face of the mold proper form and centering with regard to the center socket $B^5$. The core sections I, I, are properly spaced apart and held in relative position by the action of the screws J' J' and the sections are secured to the sand supporting and centering plate H by the bolts K. The core is then built up as by brick-work M, and faced with loam, proper conformation being given to the outer face of the loam indicated at F' by the action of the strike $P^4$ which is centered in a centering plate B having a conical seat $B^2$ and central socket similar to that of the plate $B^4$ attached to the mold base. As shown, and this is important, where a long strike is used the edge of the strike is in contact with an annular surface of the strike shaft support as shown in Figs. 3 and 4. The core being completed it is lifted out of the centering plate $B^4$ shown in Fig. 4 and lowered into the mold so that its supporting and centering plate H seats itself in the conical surface $B^2$ of the plate B attached to the mold base as a result of which the core is necessarily and automatically centered in the mold, the hot metal is then poured into the mold and after it has solidified the core center is detached from the supporting and centering plate H and collapsed by turning the screws J' J' in proper direction, after which of course the core is removed.

In the modified apparatus of Figs. 5, 6 and 7 the flask being placed upon the supporting plates a pattern Q is inserted in the flask and properly secured by its conical end Q' in the conical seat BB' of the plate BB, sand is then tamped into the space between the flask and the pattern and the pattern withdrawn leaving a fully formed mold. The core center sections II, are properly spaced by the screws JJ' and secured by bolts KK, to the supporting and centering plate HH, which is properly centered by engagement with the conical seat BB' of the centering plate BB, supporting pattern R. Sand is tamped between the core and the pattern R after which the core is withdrawn from the pattern dried and lowered into the mold and properly centered therein as shown in Fig. 5, the metal is poured, the core detached from the centering and supporting plate, collapsed and withdrawn.

The method of operation of the modified form shown in Fig. 8 needs, I believe, no further or detailed description than that already given.

Having now described my invention, what I claim as new and desire to secure by Letters Patent, is:

1. Molding apparatus comprising a flask support, a centering ring secured to said support having an upwardly and outwardly flared annular seat for the sand supporting and centering ring of the core, a core center, a sand supporting and centering ring detachably secured to said center and extending beyond the bottom thereof to form a sand support, said ring having its outer edge tapered downwardly and inwardly to fit in the centering ring of the flask.

2. Molding apparatus comprising a flask support, a centering ring secured to said support having an upwardly and outwardly flared annular seat for the sand supporting and centering ring of the core, a collapsible core center, and a sand supporting and centering ring detachably secured to said center and extending beyond the bottom thereof to form a sand support, said ring having its outer edge tapered downwardly and inwardly to fit in the centering ring of the flask.

3. Molding apparatus comprising a flask support, a centering ring secured to said support having an upwardly and outwardly flared annular seat for the sand supporting and centering ring of the core and a central socket for a striker shaft, a core center and a sand supporting and centering ring detachably secured to said center and extending beyond the bottom thereof to form a sand support, said ring having its outer edge tapered downwardly and inwardly to fit in the centering ring of the flask.

4. Molding apparatus comprising a flask support, a centering ring secured to said support having an upwardly and outwardly flared annular seat for the sand supporting and centering ring of the core and a central socket for a striker shaft, a core center, a sand supporting and centering ring detachably secured to said center and extending beyond the bottom thereof to form a sand support, said ring having its outer edge tapered downwardly and inwardly to fit in the centering ring of the flask, and a forming seat for the core having a tapered seat for the sand supporting ring and a centering socket for a striker shaft.

5. Molding apparatus comprising a flask support, a centering ring secured to said support having an upwardly and outwardly flared annular seat for the sand supporting and centering ring of the core and a central socket for a striker shaft, a core center, a sand supporting and centering ring detachably secured to said center and extending beyond the bottom thereof to form a sand support, said ring having its outer edge tapered downwardly and inwardly to fit in the centering ring of the flask and a forming seat for the core having a tapered seat for the sand supporting ring, an annular striker guide on its outer periphery and a centering socket for a striker shaft.

6. Molding apparatus comprising a flask support, a centering ring secured to said support having an upwardly and outwardly flared annular seat for the sand supporting and centering ring of the core and a central socket for a striker shaft, a core center, a sand supporting and centering ring detachably secured to said center and extending beyond the bottom thereof to form a sand support, said ring having its outer edge tapered downwardly and inwardly to fit in the centering ring of the flask and a forming seat for the core having a tapered seat for the sand supporting ring.

THOMAS P. ANTHONY.